United States Patent [19]

Keller et al.

[11] 3,877,937
[45] Apr. 15, 1975

[54] POLYRHODANINE SENSITIZERS FOR ORGANIC PHOTOCONDUCTORS

[75] Inventors: Juergen H. H. Keller, Chelmsford; Robert H. Sprague, Carlisle, both of Mass.

[73] Assignee: Itek Corporation, Lexington, Mass.

[22] Filed: June 4, 1973

[21] Appl. No.: 366,906

[52] U.S. Cl.............. 96/1.6; 260/67.5; 260/302 R; 260/302 H
[51] Int. Cl.............................................. G03g 5/06
[58] Field of Search ............... 96/1.6, 1.7, 127, 128

[56] References Cited
UNITED STATES PATENTS

| | | | |
|---|---|---|---|
| 2,475,163 | 7/1949 | Thompson | 96/127 X |
| 3,152,905 | 10/1964 | Caspar | 96/128 X |
| 3,335,010 | 8/1967 | Taber et al. | 96/128 X |
| 3,687,946 | 8/1972 | Yao | 96/1.6 X |
| 3,728,125 | 4/1973 | Shiba et al. | 96/128 X |

OTHER PUBLICATIONS

Meier et al., "Doping Organic Photoconductors," Zeit. Phys. Chem., Neue Folge, 39, pp. 249–261, 1963.

*Primary Examiner*—Roland E. Martin, Jr.
*Attorney, Agent, or Firm*—Homer O. Blair; Robert L. Nathans; David E. Brook

[57] ABSTRACT

Polyrhodanine compounds are disclosed which act as dopants for pigment-type, organic, photoconductor materials. Very small amounts of these polyrhodanines co-precipitated with the organic photoconductors produce dramatic increases in the sensitivity of the photoconductors.

8 Claims, No Drawings

POLYRHODANINE SENSITIZERS FOR ORGANIC PHOTOCONDUCTORS

BACKGROUND OF THE INVENTION

1. Field of the Invention

This invention relates to dopants for pigment-type organic photoconductors to increase the speed of such photoconductors.

2. Description of the Prior Art

Various photoconductive insulating materials have been used in electrophotographic processes. Recently, many new organic photoconductors have been described in the general scientific and patent literature. Some of these organic photoconductors can be described as pigment-type organic photoconductors.

Although it has been known to use spectral sensitizers with organic photoconductors, it is not believed that dopants have been used. Doping refers to the controlled introduction of trace impurities into pure crystal lattices in order to obtain desired physical properties, whereas spectral sensitization refers to admixing larger quantities of dyes with photosensitive materials to extend their sensitivity to other wavelengths of light.

SUMMARY OF AN EMBODIMENT OF THE INVENTION

In one embodiment, the invention comprises the use of small amounts of polyrhodanine dyes as dopants for pigment type organic photoconductors. These polyrhodanine compounds can be co-precipitated from solution with suitable pigment-type organic photoconductors, such as merocyanine dyes, to form highly sensitive organic photoconductive compositions. These photoconductive compositions can be dispersed in insulating binder materials, such as solutions of polystyrene, and then coated on suitable electrophotographic supports.

Pigment-type organic photoconductors are conveniently prepared in large batches and subsequently purified by crystallization from appropriate solvents. This usually removes trace amounts of impurities which tend to act as sensitivity enhancing dopants, resulting in relatively insensitive materials. Addition of these polyrhodanine dopants as described herein, by techniques such as co-precipitation, restores high sensitivity to the purified photoconductors in a controlled manner.

DESCRIPTION OF THE INVENTION

The rhodanine dopants described herein can be represented by the following structural formula:

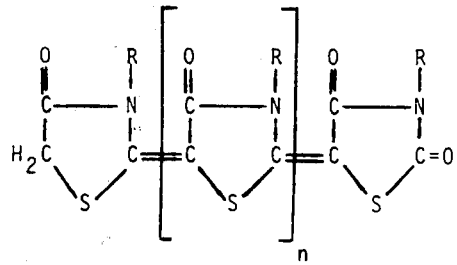

wherein:

$n$ equals 1, 2, 3 or 4; and,

R represents hydrogen; $C_1$–$C_4$ alkyl including unsubstituted, substituted and/or unsaturated alkyls; aryl; or aralkyl.

More specifically, the polyrhodanine dopants are represented as follows:

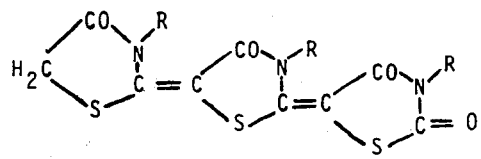

Polyrhodanine I

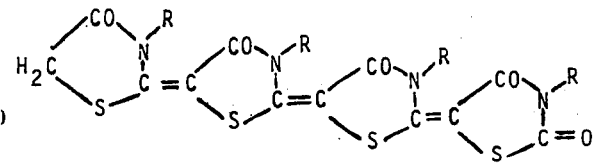

Polyrhodanine II

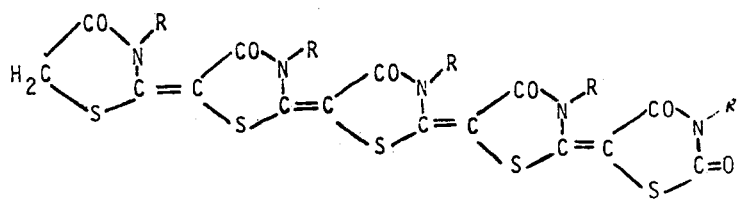

Polyrhodanine III

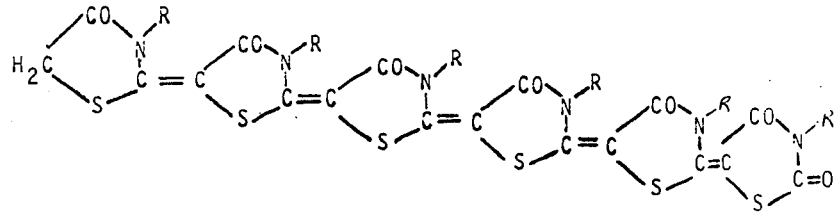

Polyrhodanine IV

Compound I above, where R is ethyl, may be named 3-ethyl-2-[3-ethyl-2(3-ethyl-2,4-dioxo-5-thiazolylidene)-4-oxo-5-thiazolidylidene]rhodanine.

The other polyrhodanines can be named following this example.

The polyrhodanines described herein are also described in my copending application, Ser. No. 366,910, filed June 4, 1973, the teachings of which are hereby incorporated by reference.

One or more of the polyrhodanine dopants can be used to greatly increase the sensitivity of pigment-type photoconductors. They are used in extremely minute quantities, such as trace amounts. For example, amounts as low as 0.01 mg./100 mg. of pigment-type photoconductors have been found to be effective.

It appears to be important, from the experimental evidence available, to form an intimate mixture of dopant and photoconductor. One suitable way of achieving this is to coprecipitate the photoconductor and dopant from solution. For example, 0.01 mg. of Compound I can be added to a solution of 100 mg. of highly purified 3-ethyl-5-(3-ethyl-2-3(H)benzoselenazolylidene)-2-(3-ethyl-5-oxo-2-thiono-5-thiazolylidene)-4-thiazolidone, a merocyanine pigment-type photoconductor, in cresol, and the two can be co-precipitated by adding methanol. This has resulted in the merocyanine photoconductor having a sensitivity more than double that of the undoped form.

One method of preparing the polyrhodanine dopants described herein is to heat a mixture of 3-ethylrhodanine and methyl-p-toluene sulfonate. A quarternary salt is formed which then condenses with another molecule of ethylrhodanine with the elimination of methyl mercaptan, giving a dinuclear compound. This then reacts further in similar fashion leading to a mixture of polyrhodanine products. This crude product can be separated into four relatively pure fractions, as described in more detail in the examples which follow.

The identity and proof of structure for Compound I where R=ethyl can be established by converting it to an analagous merocyanine dye by a condensation reaction with a methylmercaptobenzothiazole quaternary salt, as follows:

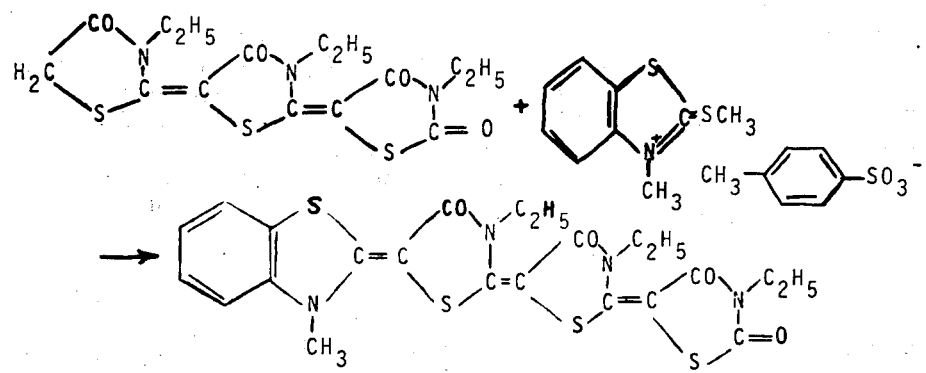

The merocyanine dye was also synthesized from a known starting dye, 5-(3-methyl-2(3H)benzothiazolylidene)-3-ethyl-2[2-(3-ethyl-4-oxo-2-thiono-5-thiazolylidene)-3-ethyl-4-oxo-5-thiazolylidene]-4-thiazolidone, by quarternization with methyl-p-toluene sulfonate followed by boiling in pyridine to hydrolyze the salt, as follows:

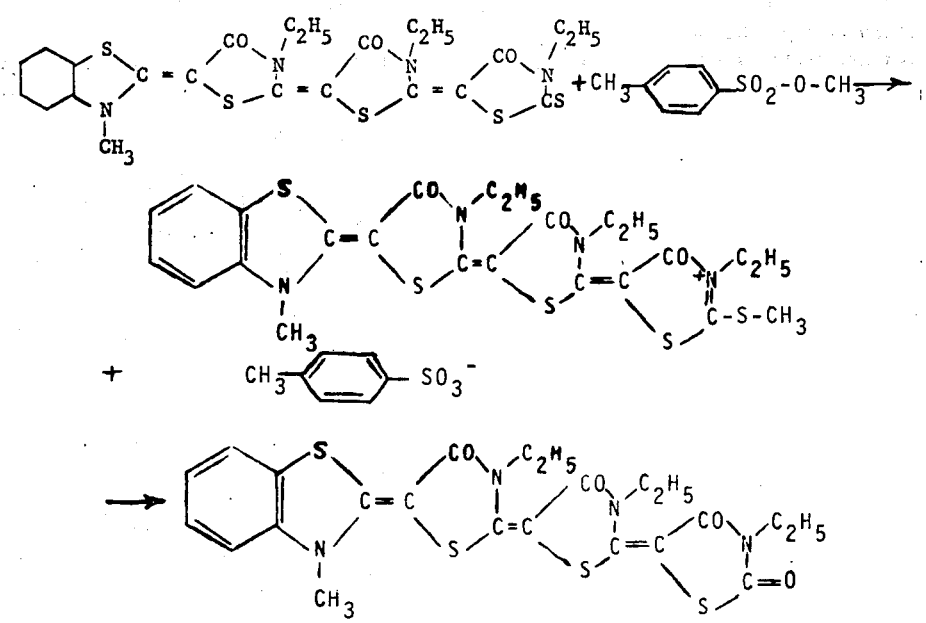

The absorption maxima of the merocyanine dyes prepared as above were found to be identical.

Elemental analyses run on Compound I and the merocyanine dye synthesized from it produced the following results:

| Merocyanine Dye | ANALYSIS | |
|---|---|---|
| | Calc'd. | Found |
| $C_{23}$ | 50.614 | 49.86 |
| $H_{22}$ | 4.056 | 3.80 |
| $N_4$ | 10.248 | 10.22 |
| $O_1$ | 11.706 | (12.64) by difference |
| $S_4$ | 23.460 | 23.48 |
| | 100.084 | 100.00 |
| Compound I | | |
| $C_{15}$ | 45.095 | 45.25 |
| $H_{17}$ | 4.289 | 4.36 |
| $N_3$ | 10.518 | 10.30 |
| $O_4$ | 16.018 | (15.72) by difference |
| $S_3$ | 24.077 | 24.37 |
| | 99.997 | 100.00 |

The dopants described herein can be used with pigment-type type organic photoconductors. These photoconductors are dispersed in insulating binders and coated onto suitable substrates. Examples of pigment-type photoconductors include merocyanine photoconductors as described in my co-pending application, ser. No. 366,907, filed June 4, 1973, and phthalocyanine-type photoconductors as described in U.S. Pat. No. 3,594,163 to Radler and the references mentioned therein. Phthalocyanines are more insoluble, however, than merocyanines, and it might be desirable to dissolve these in a strong acid such as sulfuric and to coprecipitate them with the polyrhodanine by adding water.

Suitable binders for these photoconductors are insulating binder materials such as polystyrene. Suitable supports are conducting supports such as aluminum plates. Other binders and supports will be known to those skilled in the art, and many have been described in the photoconductor literature.

The following examples further illustrate the invention. All parts and percentages are by weight unless otherwise indicated.

EXAMPLE 1

Preparation of Polyrhodanine I

Ten grams of N-ethylrhodanine were mixed with 20 grams of methyl-p-toluenesulfonate and heated to 150°C. After reaching 150°C., the reaction mixture turned darker rapidly and the temperature rose to 200°C. without further application of heat. The reaction mixture was left standing for 5 minutes, during which time the temperature fell to 160°C. The mixture was further cooled to 20°C., stirred with ether, decanted and treated with several further portions of ether until a heavy, sticky residue remained. This residue was stirred with 350 ccs. of absolute ethanol, heated and left standing overnight at room temperature. The next morning the solution was filtered with suction and the solid product was washed with ethanol. 4.2 grams of a solid product were obtained; this product was a mixture of polyrhodanine compounds I, II, III, and IV.

The ethanol filtrate was concentrated to 150 ccs. at which time crystals started to form in the boiling solution. The mixture was cooled and the product filtered off to yield 2.1 grams of yellow crystals, with an absorption maximum in Cresol at 450 nm. The crystals were extracted with 7×200 ccs. of boiling methanol. The extracts were combined and chilled. Crystals formed and were filtered off. A small amount of an impurity, having an absorption maximum at 494 nm., was removed by dissolving in 300 ccs. in boiling acetone and treatment with four consecutive portions of Norite A. The acetone solution was concentrated to 50 cc. and cooled. On filtration, Polyrhodanine I was obtained as yellow-orange crystals. M.P. 269°–271°C. D-max: 1.24 in pyridine, 1/110,000 at 424 nm. (430 in Cresol).

EXAMPLE 2

Preparation of Polyrhodanine II

The 4.2 grams of original crystal product in Example 1 were extracted with 4×50 ccs. of hot acetone to remove most of polyrhodanine I which was still present in this mixture, as shown by a curve, which indicated absorption maxima in cresol at 430, 495, 550 and 610 nm. 3.8 grams remained undissolved, of which 3.5 grams were extracted with 250 ccs. of boiling pyridine. The solution was cooled and the crystals that formed were filtered off to yield 0.8 grams of Polyrhodanine II. D-max: 0.78 in pyridine, 1/210,000 at 470 nm. (495 in Cresol).

EXAMPLE 3

Preparation of Polyrhodanine III

The solid material remaining after extraction with boiling pyridine in Example 2 was further extracted with 4×50 ccs. of boiling pyridine. Only a very small amount went into solution. After standing overnight in the refrigerator, the solution was filtered, and 0.015 grams of a light purple dye, polyrhodanine III, was obtained having an absorption maximum at 550 nm. in Cresol.

EXAMPLE 4

Preparation of Polyrhodanine IV 0.5 grams of the material still undissolved after Example 3 was extracted with 50 ccs. of Cresol at 150°–160°C. The remaining residue was stirred with acetone and filtered, and then thoroughly washed with acetone to remove all the Cresol. 0.2 grams polyrhodanine IV were obtained as a dark purple material, having an absorption maximum at 610 nm. in Cresol.

EXAMPLE 5

Preparation of Electrophotographic Plate Containing Undoped Merocyanine Photoconductor An electrophotographic plate containing a merocyanine pigment-type photoconductor was prepared as described herein. The merocyanine photoconductor had the following structural formula:

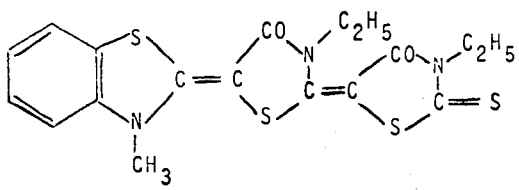

The preparation of this merocyanine pigment-type photoconductor is disclosed in detail in Example 1 of my co-pending patent application, Ser. No. 366,907, filed concurrently herewith.

50 mg. of pigment was dispersed in one-half cc. of a 10 percent solution of polystyrene in tetrahydrofuran. This solution was coated onto a 0.006 inch grained aluminum plate by means of a Bird applicator to give a 0.003 inch wet thickness. The plate was dried for a minimum of 30 minutes at 100°C. before testing for dark decay and sensitivity on an electrostatic testing apparatus. This apparatus rotated the plate under a corona charger until the surface potential (measured on an oscilloscope) reached 500 volts. The charging current was shut off and the percent drop in voltage after 15 seconds was recorded (dark decay). The plate was then recharged to 500 volts and exposed to a 15 watt tungsten light source held 2 inches from the sample. Percent drop in voltage in 3 seconds was recorded as sensitivity. If 100 percent discharge, or amounts approaching 100 percent occurred in less than 3 seconds, the charge exposure cycle was repeated using a 0.5, 1.0 or 2.0 neutral density filter between the sample and the light source.

The results of the dark decay and sensitivity testing are presented in the table which follows Examples 6–16.

EXAMPLES 6–16

Co-precipitation of Merocyanine Photoconductors With Polyrhodanine Dopants

These examples illustrate the co-precipitation technique using a highly purified pigment-type photoconductor and a doping polyrhodanine of this invention. The organic photoconductor is the merocyanine described in Example 5. The amounts of photoconductor, and the type and amount of polyrhodanine dopant are specified in the table which follows.

The dopant is dissolved in 10 ccs. of hot Cresol. The photoconductor is added and goes into solution instantly. Methanol is added in an amount sufficient to cause the formation of a heavy precipitate. The precipitate is filtered, washed with methanol, dried and then used to form the photoconductive insulating coatings.

The electrophotographic plates are prepared as described in Example 5.

EXAMPLES 17–21

The photoconductor used in these examples has the following structural formula:

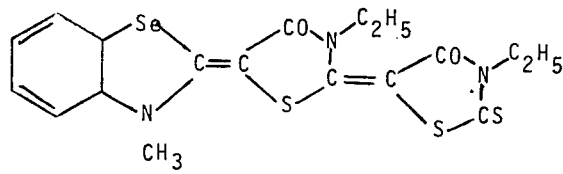

This photoconductor is made following the procedure of Example 1 of my co-pending application Ser. No. 366,907, filed concurrently herewith, except that the benzothiazole compound used as a starting material therein is replaced with an analagous benzoselenazole.

Co-precipitation of the merocyanine of this example is accomplished with the appropriate polyrhodanine dopant following the co-precipitation technique described in Examples 6–16. Electrophotographic plates are prepared as described in Example 5. The results are presented in the following table.

TABLE

| Ex. No. | Merocyanine -Photoconductor- Amt.(mg) | Dopant Type | Dopant Amt.(mg) | Dark Decay | Sensitivity |
|---|---|---|---|---|---|
| 17 | 100 | – | – | 0 | 70 |
| 18 | 100 | II. | 5 | 20 | 100 – ½ sec. 90[1] – 2 sec. |
| 19 | 100 | I. | 5 | 10 | 100 – 1 sec. 78[1] |
| 20 | 100 | IV. | 0.1 | 10 | 100 – 1½ sec. 78[1] |
| 21 | 100 | III. | 0.01 | 10 | 92 – 1½ sec. 63[1] |

[1] 0.5 neutral density filter
[2] 1.0 neutral density filter
[3] 2.0 neutral density filter

TABLE

| Ex. No. | Merocyanine -Photoconductor- Amt.(mg) | Dopant Type | Dopant Amt.(mg) | Dark Decay | Sensitivity |
|---|---|---|---|---|---|
| 5 | 100 | – | – | 23 | 65 |
| 6 | 100 | II. | 5 | 16 | 100 – ½ sec. 100[1] – 2 sec. |
| 7 | 100 | II. | 5 | 20 | 100 – 1 sec. 90[1] – 2 sec. |
| 8 | 100 | III. | 5 | 20 | 100 – ½ sec. 100[1] – 2 sec. 16[3] |
| 9 | 100 | II. | 5 | 33 | 100 – 1 sec. 70[1] |
| 10 | 100 | IV. | 5 | 20 | 100 – 1 sec. 70[1] |
| 11 | 100 | III. | 5 | 20 | 100 – 1 sec. 92[1] |
| 12 | 100 | IV. | 1 | 16 | 100 – 1 sec. 92[1] |
| 13 | 100 | IV. | 0.1 | 10 | 100 – 1 sec. 93[1] |
| 14 | 100 | IV. | 0.01 | 10 | 100 – 1½ sec. 70[1] |
| 15 | 100 | III. | 0.1 | 15 | 100 – 1 sec. 85[1] |
| 16 | 100 | III. | 0.1 | 20 | 100 – 1 sec. 85[1] |

[1] 0.5 neutral density filter
[2] 1.0 neutral density filter
[3] 2.0 neutral density filter

What is claimed is:

1. A process of improving the sensitivity of an organic, pigment-type photoconductor by forming an intimate mixture of said photoconductor and a small amount of a polyrhodanine compound, said polyrhodanine being represented by the following structural formula:

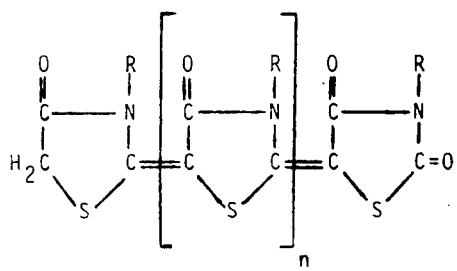

wherein:

$n$ equals 1, 2, 3 or 4; and,

R represents hydrogen; $C_1$–$C_4$ alkyl; aryl; or aralkyl.

2. A process of claim 1 wherein said photoconductor and said polyrhodanine compounds are co-precipitated from solution.

3. A process of claim 2 wherein said photoconductor comprises a merocyanine, pigment-type, organic photoconductor.

4. A process of claim 3 wherein R equals a $C_1$–$C_4$ alkyl.

5. A process for improving the sensitivity of a merocyanine, pigment-type, organic photoconductor by doping said photoconductor with a small amount of a polyrhodanine compound represented by the following general structural formula:

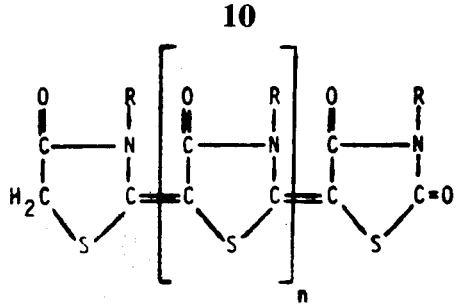

wherein:

$n$ equals 1, 2, 3 or 4; and,

R represents hydrogen; $C_1$–$C_4$ alkyl; aryl; or aralkyl.

6. A photoconductive composition comprising an organic, pigment-type, photoconductor and intimately dispersed therewith a small amount of a polyrhodanine compound having the following structural formula:

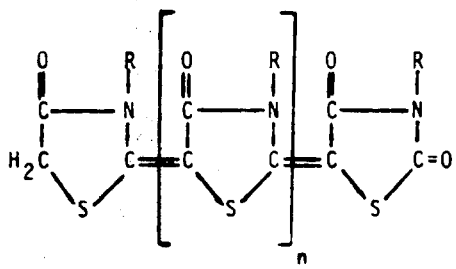

wherein:

$n$ equals 1, 2, 3 or 4; and,

R represents hydrogen; $C_1$–$C_4$ alkyl; aryl; or aralkyl.

7. A composition of claim 6 wherein said organic photoconductor comprises a merocyanine.

8. A composition of claim 7 wherein R equals a $C_1$–$C_4$ alkyl.

* * * * *